US009064001B2

(12) United States Patent
Liu et al.

(10) Patent No.: US 9,064,001 B2
(45) Date of Patent: Jun. 23, 2015

(54) METHOD AND APPARATUS FOR A FREQUENTLY-ASKED QUESTIONS PORTAL WORKFLOW

(71) Applicant: Nuance Communications, Inc., Burlington, MA (US)

(72) Inventors: Ding Liu, Lowell, MA (US); Real Tremblay, Outremont (CA); Jerome Tremblay, Montreal (CA); Serge Robillard, Lachine (CA)

(73) Assignee: Nuance Communications, Inc., Burlington, MA (US)

( * ) Notice: Subject to any disclaimer, the term of this patent is extended or adjusted under 35 U.S.C. 154(b) by 147 days.

(21) Appl. No.: 13/832,896

(22) Filed: Mar. 15, 2013

(65) Prior Publication Data

US 2014/0280169 A1 Sep. 18, 2014

(51) Int. Cl.
G06F 17/30 (2006.01)
G10L 15/18 (2013.01)
G06Q 30/06 (2012.01)

(52) U.S. Cl.
CPC ...... *G06F 17/30598* (2013.01); *G10L 15/1815* (2013.01); *G06Q 30/0641* (2013.01)

(58) Field of Classification Search
CPC ............... G06F 17/30591; G06F 17/30598; G06F 17/30; G06F 17/28; G06F 17/209; G06F 17/30864; G06F 17/289; G06F 8/65; G06F 17/2785; G06F 17/30731; G10L 17/22; G10L 15/18; G10L 15/1815; H04L 67/14; G06N 99/005; H04M 3/42136; G06Q 30/0641
USPC .......... 707/739, 749, 736, 740, E17.046, 723, 707/769, 722, E17.069, E17.089; 704/275, 704/257, 254, 239, 9, 8, E15.018, 236, 704/270.1, 270; 717/173, 171, 106; 455/414.1; 706/12, 11, 55; 715/764; 709/226; 379/265.02, 88.05, 67.1, 88.6
See application file for complete search history.

(56) References Cited

U.S. PATENT DOCUMENTS 6,028,601 A * 2/2000 Machiraju et al. ............ 715/705
6,327,590 B1 12/2001 Chidlovskii et al.
(Continued)

FOREIGN PATENT DOCUMENTS

WO WO 2008/051747 5/2008
WO WO 2011/126458 10/2011

OTHER PUBLICATIONS

Xuanhui Wang and ChengXiang Zhai—"Learn from web search logs to organize search results"—Published in: Proceeding SIGIR '07 Proceedings of the 30th annual international ACM SIGIR conference on Research and development in information retrieval—Jul. 23-27, 2007—pp. 87-94.*

(Continued)

*Primary Examiner* — Anh Ly
(74) *Attorney, Agent, or Firm* — Hamilton, Brook, Smith & Reynolds, P.C.

(57) ABSTRACT

In FAQ based systems, associating questions with answers can be a time consuming task if performed manually. In one embodiment, a method of building a frequently-asked questions (FAQ) portal can include creating cluster labels. The labels can include predefined universal semantic labels and application-specific labels. The method can further include applying the cluster labels to clusters of queries within an FAQ application. The method can additionally include adjusting the application-specific labels to support combined and newly created clusters of queries based on application-specific queries within the FAQ application on an ongoing basis and reapplying the universal semantic labels and the adjusted application-specific labels to the combined and newly created clusters of queries. The method and system proposed herein allow for the automated clustering of queries and association with applicable answers, which leads to higher efficiencies for a faster response time for a user.

20 Claims, 8 Drawing Sheets

(56) References Cited

U.S. PATENT DOCUMENTS

| | | | |
|---|---|---|---|
| 6,766,320 | B1 | 7/2004 | Wang et al. |
| 7,284,004 | B2* | 10/2007 | Cooper et al. ......... 707/E17.009 |
| 7,606,714 | B2* | 10/2009 | Williams et al. ............. 704/275 |
| 8,255,793 | B2 | 8/2012 | Chakrabarti et al. |
| 2002/0065845 | A1* | 5/2002 | Naito et al. ................ 707/500.1 |
| 2003/0028448 | A1 | 2/2003 | Joseph et al. |
| 2004/0111408 | A1 | 6/2004 | Caudill et al. |
| 2005/0076003 | A1 | 4/2005 | DuBose et al. |
| 2005/0080614 | A1 | 4/2005 | Bennett |
| 2006/0080107 | A1* | 4/2006 | Hill et al. ...................... 704/275 |
| 2006/0100998 | A1 | 5/2006 | Edwards |
| 2006/0136455 | A1* | 6/2006 | Wen et al. ..................... 707/101 |
| 2006/0149553 | A1* | 7/2006 | Begeja et al. ................. 704/275 |
| 2007/0124263 | A1 | 5/2007 | Katariya et al. |
| 2007/0136246 | A1* | 6/2007 | Stenchikova et al. ............. 707/3 |
| 2008/0071533 | A1* | 3/2008 | Cave et al. .................... 704/235 |
| 2008/0281814 | A1* | 11/2008 | Calistri-Yeh et al. ............. 707/5 |
| 2008/0294584 | A1* | 11/2008 | Herz ............................... 706/46 |
| 2009/0012873 | A1* | 1/2009 | Hamling et al. ................ 705/26 |
| 2009/0019026 | A1 | 1/2009 | Valdes-Perez et al. |
| 2009/0055184 | A1* | 2/2009 | Hebert .......................... 704/257 |
| 2009/0070311 | A1* | 3/2009 | Feng ................................. 707/5 |
| 2009/0228264 | A1* | 9/2009 | Williams et al. .................. 704/9 |
| 2010/0030769 | A1* | 2/2010 | Cao et al. .......................... 707/5 |
| 2010/0030770 | A1* | 2/2010 | Cao et al. .......................... 707/5 |
| 2010/0094629 | A1 | 4/2010 | Emori et al. |
| 2010/0145710 | A1* | 6/2010 | Tremblay ...................... 704/275 |
| 2011/0145333 | A1 | 6/2011 | Hind |
| 2011/0238408 | A1 | 9/2011 | Larcheveque et al. |
| 2011/0238409 | A1 | 9/2011 | Larcheveque et al. |
| 2011/0320442 | A1* | 12/2011 | Faruquie et al. .............. 707/723 |
| 2013/0007055 | A1 | 1/2013 | Brown et al. |
| 2013/0018876 | A1 | 1/2013 | Chu-Carroll et al. |
| 2013/0144890 | A1 | 6/2013 | Liu |
| 2013/0226906 | A1* | 8/2013 | Lebrun et al. ................. 707/722 |
| 2013/0288219 | A1 | 10/2013 | Dheap et al. |
| 2014/0006012 | A1 | 1/2014 | Zhou et al. |
| 2014/0172757 | A1 | 6/2014 | Liu |

OTHER PUBLICATIONS

Claudio Carpineto and Giovanni Romano—"A Survey of Automatic Query Expansion in Information Retrieval"—Journal ACM Computing Surveys (CSUR) Surveys Homepage archive—vol. 44 Issue 1, Jan. 2012—Article No. 1; pp. 1-50.*

European Search Report in Application No. 12 195 753.4, Entitled Method and Apparatus for Operating a Frequently Asked Questions (FAQ)—Based System, dated Apr. 22, 2013.

Wen-Yun Yang, Yunbo Cao, Chin-Yew Lin, A Structural Support Vector Method for Extracting Contexts and Answers of Questions from Online Forums, Proceedings of the 2009 Conference on Empirical Methods in Natural Language Processing, pp. 514-523, Singapore, Aug. 6-7, 2009, http://aclweb.org/anthology-new/D/D09/D09-1504.pdf.

Gao Cong, Long Wang, Chin-Yew Lin, Young-In Song, Yueheng Sun, Finding Question-Answer Pairs from Online Forums, SIGIR '08, Jul. 20-24, 2008, Singapore, http://courses.cs.byu.edu~cs653ta/projs/rsh-papers-QA.pdf.

David Pinto, Michael Branstein, Ryan Coleman, W. Bruce Croft, Matthew King, Wei Li, Xing Wei, QuASM: A System for Question Answering Using Semi-Structured Data, JCDL '02, Jul. 13-17, 2002, Portland, Oregon, http://www.google.com/url?JCDL '02 Proceedings of the 2nd ACM/IEEE-CS joint conference on Digital libraries.

David Pinto, Andrew McCallum, Xing Wei, W. Bruce Croft, Table Extraction Using Conditional Random Fields, SIGIR '03, Jul. 28-Aug. 1, 2003, Toronto, Canada, http://people.cs.umass.edu~mccallum/papers/crftable-sigir2003.pdf.

Xing Wei, Bruce Croft, Andrew McCallum, Table Extraction for Answer Retrieval, Information Retrieval Journal (IRJ), vol. 9, issue 5, pp. 589-611, Nov. 2006, http://people.cs.umass.edu/%7Emccallum/papers/TableExtraction-irj06.pdf.

Ashwini Pande, Table Understanding for Information Retrieval, Aug. 19, 2002, Blacksburg, VA, http://scholar.lib.vt.edu/theses/available/etd-08282002-151909/unrestricted/AshwiniPandeTableIR.pdf.

* cited by examiner

METHOD AND APPARATUS FOR A FREQUENTLY-ASKED QUESTIONS PORTAL WORKFLOW

BACKGROUND OF THE INVENTION

Question Answering (QA) systems receive a query (e.g., a question) from a user, either in text or voice form, and provide an answer to the user. QA systems generally are configured to provide answers for common questions in a given topic area.

SUMMARY OF THE INVENTION

In one embodiment, a method of building a frequently-asked questions (FAQ) portal can include creating cluster labels. The labels can include predefined universal semantic labels and application-specific labels. The method can further include applying the cluster labels to clusters of queries within an FAQ application. The method can additionally include adjusting the application-specific labels to support combined and newly created clusters of queries based on application-specific queries within the FAQ application on an ongoing basis and reapplying the universal semantic labels and the adjusted application-specific labels to the combined and newly created clusters of queries.

In another embodiment, the method can include creating seed clusters based on answers to the queries of the clusters.

In a further embodiment, the method can include creating clusters by extracting features of answers independent of the queries.

In an additional embodiment, the method can include creating one-to-many mappings from the universal semantic labels to the application-specific labels. The one-to-many mappings can apply to clusters of queries for which the FAQ application is configured to issue at least one of multiple answers. The method can further include applying a user-history of the FAQ application to define a one-to-many mapping from the universal semantic label to a most-likely application-specific label.

In yet another embodiment, creating the cluster labels can further include using content of the query itself as the application-specific label.

In another embodiment, the method can create clusters by extracting features of answers dependent on the queries.

In another embodiment, a system for building a frequently-asked questions (FAQ) portal can include a labeling module configured to create cluster labels. The labels can include predefined universal semantic labels and application-specific labels. The system can further include a label application module configured to apply the cluster labels to clusters of queries within an FAQ application. The system can additionally include an adjustment module configured to adjust the application-specific labels to support combined and newly created clusters of queries based on application-specific queries within the FAQ application on an ongoing basis and reapplying the universal semantic labels and the adjusted application-specific labels to the combined and newly created clusters of queries.

In yet a further embodiment, a non-transitory computer-readable medium can be configured to store instructions for building a frequently-asked questions (FAQ)-portal. The instructions, when loaded and executed by a processor, can cause the processor to create cluster labels. The label can include predefined universal semantic labels and application-specific labels. The instructions can further cause the processor to apply the cluster labels to clusters of queries within an FAQ application. The instructions can additionally cause the processor to adjust the application-specific labels to support combined and newly created clusters of queries based on application-specific queries within the FAQ application on an ongoing basis and reapplying the universal semantic labels and the adjusted application-specific labels to the combined and newly created clusters of queries.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In one embodiment, a system provides a systematic method of collecting and tagging frequently-asked-questions (FAQ) training data.

A FAQ application according to the embodiment can classify a query into one of many existing categories. Similar to call routing, large amounts of field data can be collected and tagged to achieve high accuracy. Manually tagging large amounts of data can be expensive and time-consuming, leading to a slower deployment of FAQ systems and a less satisfactory customer experience. The present system implements a portal (e.g., an FAQ portal or product) that is either (a) hosted on a server or (b) residing on the premises. The portal encompasses the workflow associated with the tagging of FAQ raw data using the latest research, tools, and techniques described herein.

Figure 1:
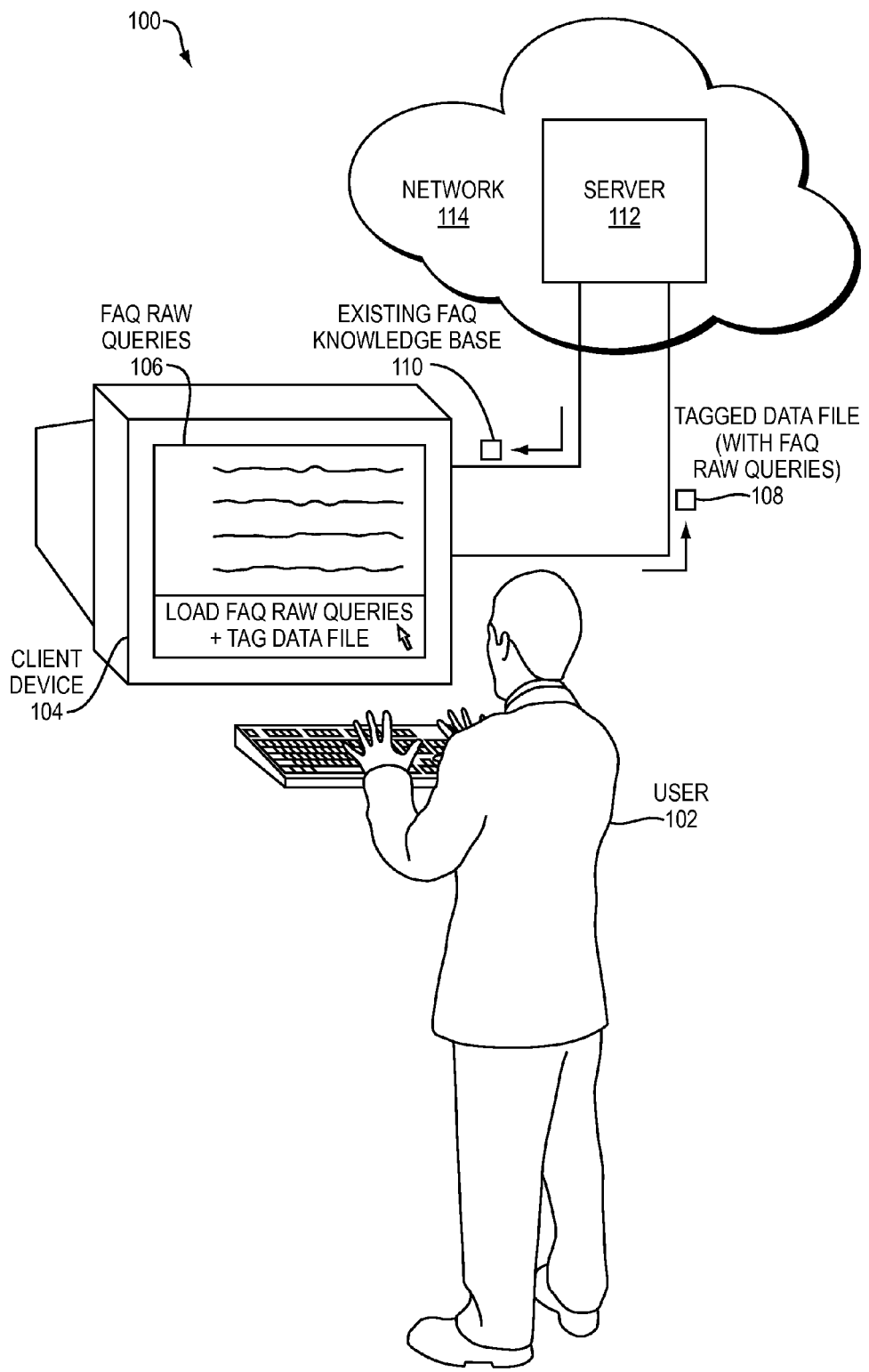
FIG. 1 is a block diagram illustrating an example embodiment of the present invention.

FIG. 1 is a block diagram 100 illustrating an example embodiment of the present invention. A user 102 uses a client device 104 to configure a server 112 being employed as an FAQ-based system. The server 112 can be on a network 114, such as an intranet or the Internet. The user 102 commands the client device 104 to load the FAQ raw queries and tag data file on the client device 104. In response, the client device 104 loads an existing FAQ knowledge base 110 from the server 112. The client device combines the FAQ raw queries 106 with the existing FAQ knowledge base 110 to generate a tagged data file 108. The tagged data file 108 is the combined FAQ knowledge base 110 and FAQ raw queries 106. The client device 104 sends the tagged data file 108 (with the FAQ or raw queries) to the server 112.

Figure 2:
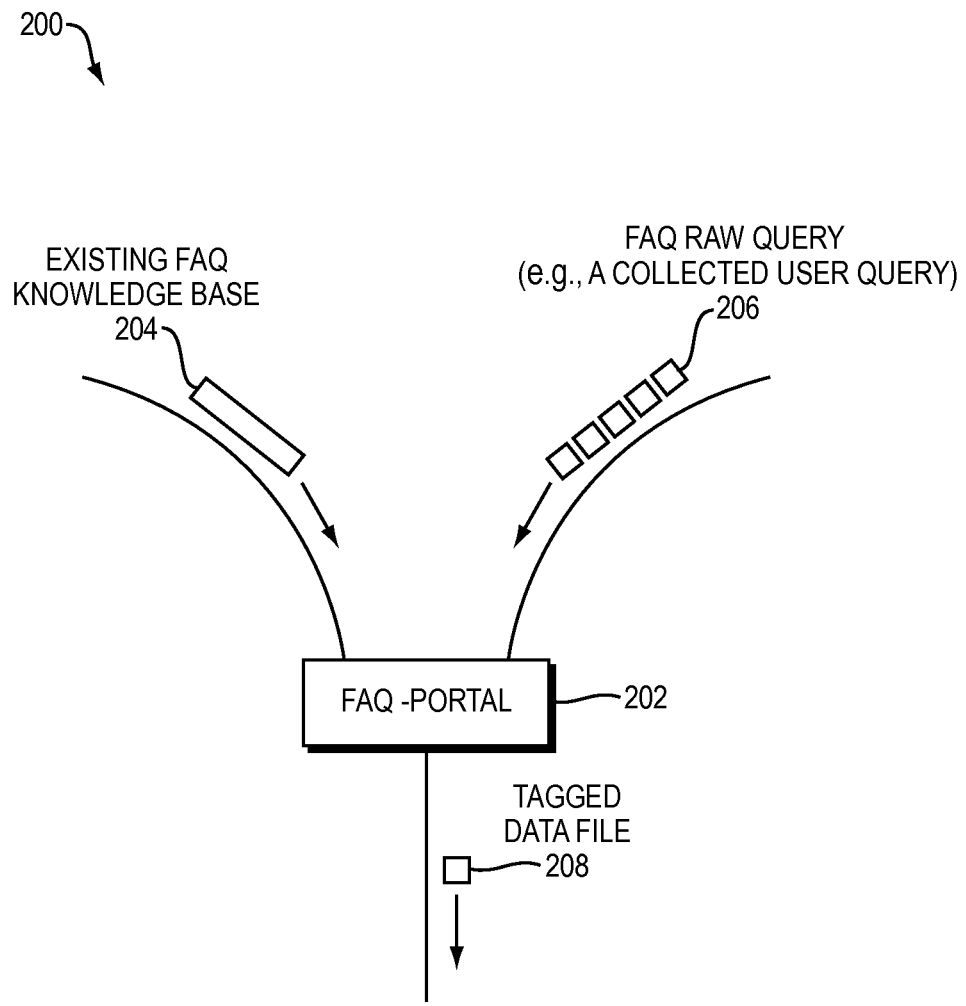
FIG. 2 is a block diagram illustrating an example embodiment of the present invention.

FIG. 2 is a block diagram 200 illustrating an example embodiment of the present invention. An FAQ portal 202 receives an existing FAQ knowledge base 204 (e.g., existing FAQ knowledge base 110 of FIG. 1) and an FAQ raw query 206 (e.g., a collected user query). The FAQ raw query 206, as shown in the diagram, can be multiple FAQ raw queries. Examples of an FAQ raw query 206 can be a query selected from a field test or user test to be incorporated into the FAQ-based system. The FAQ portal 202 combines the existing FAQ knowledge base 204 and the FAQ raw query 206 (or queries) into tagged data file 208. The tagged data file 208 is then used to update the FAQ-based system.

The FAQ portal receives at least these two inputs: (1) an existing FAQ knowledge base 204 that contains a set of standard questions and corresponding answers; and (2) a set of FAQ raw queries 206 that are a set of user queries collected in the field test (e.g., a demo or user test). Depending on the application, FAQ raw queries 206 in the set can be associated with a response generated by a human agent from the field test.

The FAQ portal can efficiently perform at least these two tasks: (1) associate an FAQ raw query 206 with one of the standard question/answer pairs of the existing FAQ knowledge base 204, if the FAQ raw query 206 can be answered by the existing FAQ knowledge base 204; and (2) group FAQ raw queries 206 that cannot be answered by the existing FAQ knowledge base 204 together and create a standard question and answer for them in the tagged data file 208.

The FAQ portal generates the semantically tagged data file 208 for the FAQ application to train its classification learning engine. The FAQ portal also provides a list of new recommended standard questions to add to the tagged data file 208 (e.g., a knowledge base system).

Figure 3:
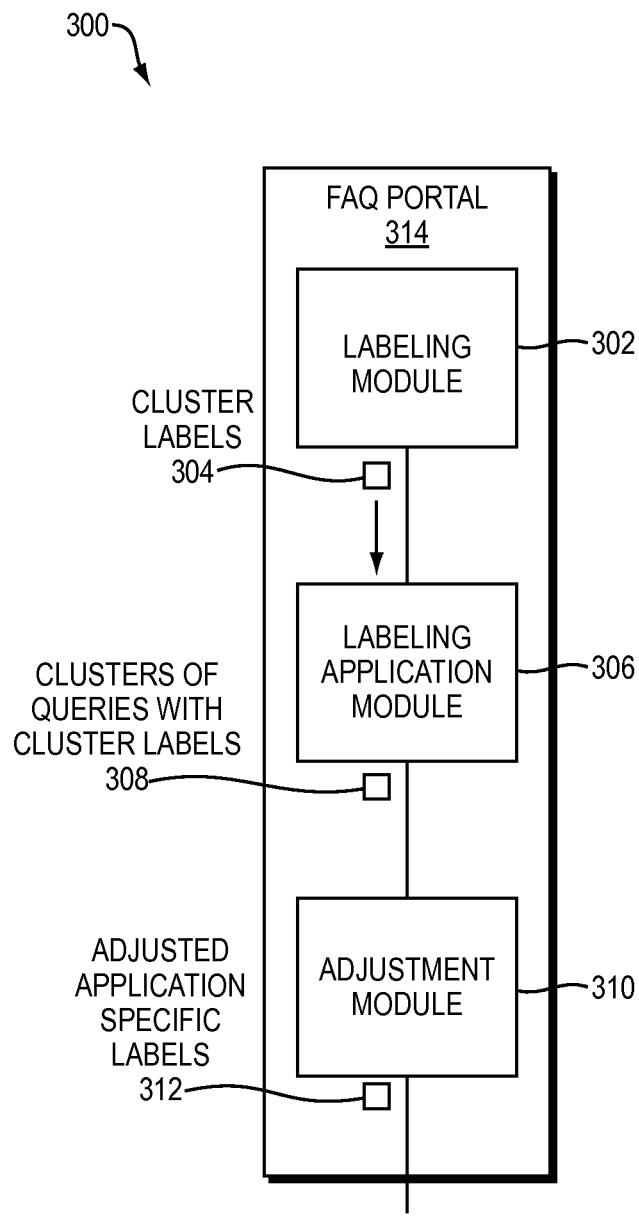
FIG. 3 is a block diagram illustrating example embodiment of the present invention.

FIG. 3 is a block diagram 300 illustrating an example embodiment of an FAQ portal 312 employed by the present invention. The FAQ portal 314 includes a labeling module 302, a label application module 306, and an adjustment module 310. The labeling module 302 generates cluster labels 304 of a series of FAQ queries. The labeling module 302 forwards the cluster labels 304 to the label application module 306. The label application module 306 then generates clusters of the queries with cluster labels 308. The label application module 306 forwards clusters of queries 308 to the adjustment module 310. The adjustment module then generates adjusted application-specific labels 312 to be sent to the FAQ-based system.

Figure 4:
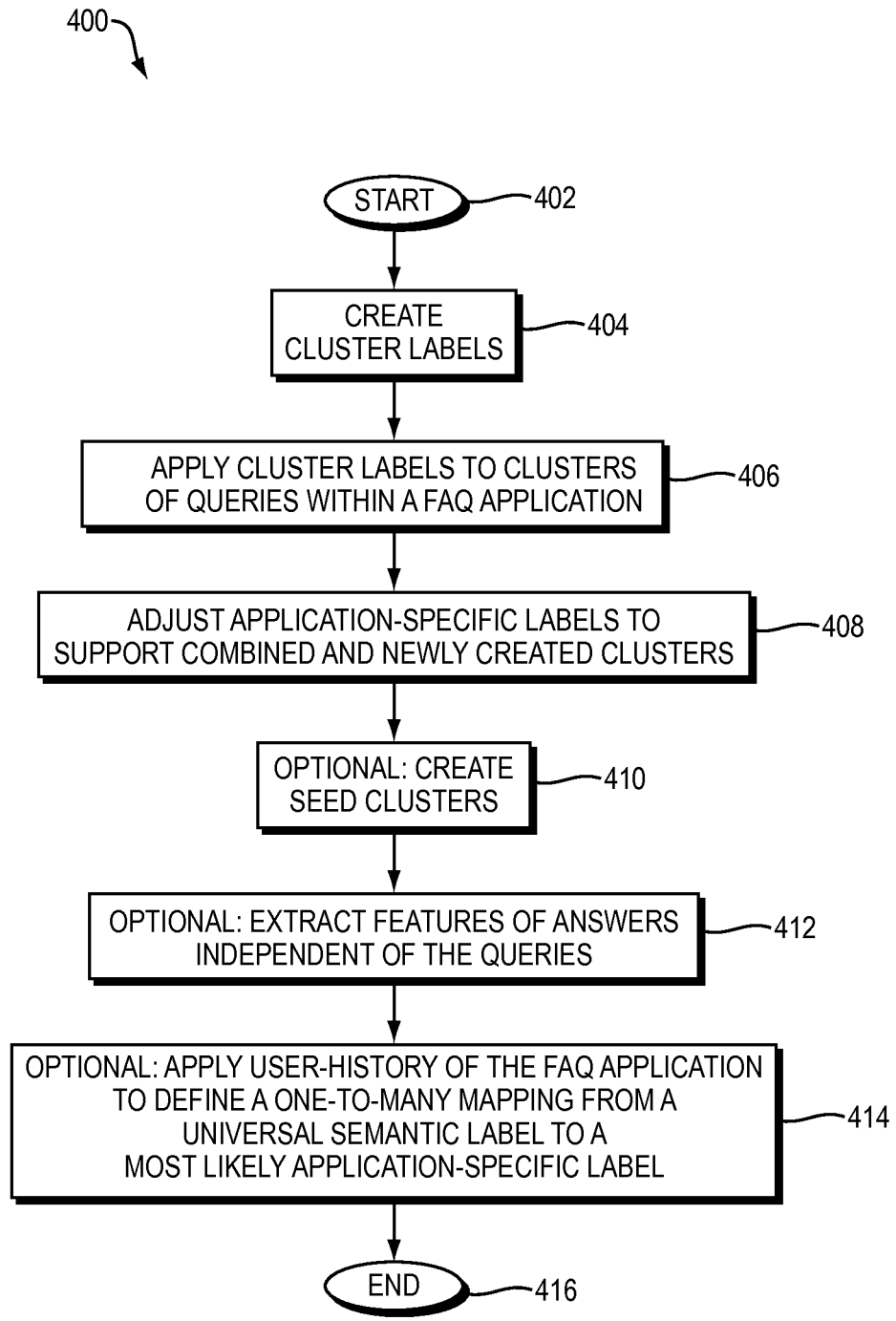
FIG. 4 is a flow diagram illustrating an example embodiment of a process employed by the present invention.

FIG. 4 is a flow diagram 400 illustrating an example embodiment of a process employed by the present invention. After the process begins (402), the process creates cluster labels (404). The cluster labels can include predefined universal semantic labels and/or application-specific labels. The method then applies cluster labels to clusters of queries within an FAQ application (406). The cluster labels can be applied to clusters of queries that the cluster labels accurately describe.

The process then adjusts application-specific labels to support combined and newly created clusters (408). The application-specific labels are based on application-specific queries within the FAQ application on an ongoing basis. The adjustment of the application-specific labels also reapplies the universal semantic labels and the adjusted application-specific labels to the combined and newly created clusters of queries.

Optionally, the process can also create seed clusters (410). A seed cluster is a new cluster based on a cluster of queries indicating a new cluster that is not represented by current clusters and cluster labels (410). In addition, the process can optionally extract features of answer independent of the queries (412). This creates clusters that are based on features of answers, instead of features of queries. In addition, the process can optionally apply a user history of the FAQ application to define a one-to-many mapping from a universal semantic label to a most likely application-specific label (414). In this example, in certain universal queries, the question may most likely be directed to a particular application based on that query. For example, a query may have a most common outcome in a particular application, such as a piece of hardware. The system can then determine that the universal semantic label maps to a most likely application specific label. Then, the process ends (416).

Figure 5:
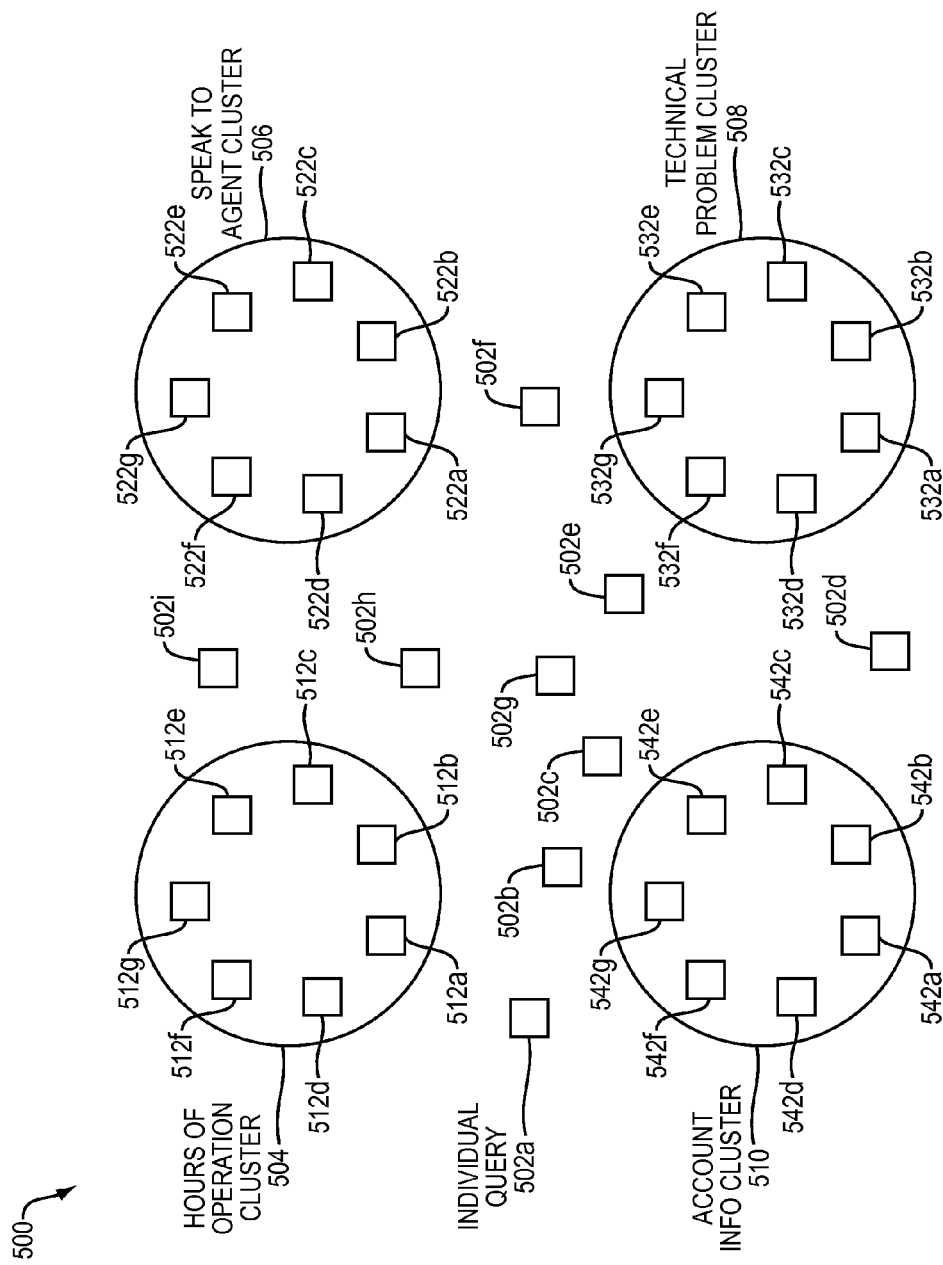
FIG. 5 is a diagram illustrating an example embodiment of a map of clusters employed by the present invention.

FIG. 5 is a diagram 500 illustrating an example embodiment of a map of clusters employed by the present invention. The map of clusters includes a plurality of individual queries 502$a$-$i$, and a plurality of clusters, including: an hours of operation cluster 504, a speak to agent cluster 506, an account information cluster 510, and a technical problem cluster 508. The hours of operation cluster 504 includes individual queries 512 $a$-$g$. The speak to agent cluster 506 includes individual queries 522$a$-$g$. The technical problem cluster 508 includes individual queries 532A-E. The account information cluster 510 includes individual queries 542$a$-$f$. Each of the clusters 504, 506, 508, 510 can include varying amounts of individual queries 512$a$-$g$, 522$a$-$g$, 532$a$-$e$, and 542$a$-$f$. In addition, the number of individual queries 502$a$-$i$ can also vary.

The hours of operation cluster 504 includes individual queries 512$a$-$g$ that inquire about hours of operation. The speak to agent cluster 506 includes individual queries 522$a$-$g$ regarding requests by the user to speak directly to an agent. The technical problem cluster 508 includes individual queries 532$a$-$e$ indicating that the user has a technical problem. The account information cluster 510 includes individual queries 542$a$-$f$ indicating that the user requests account information. Further, the system can determine that individual queries 502$a$-$i$ be placed or merged into any one of the clusters 504, 506, 508, and 510. In addition, the system can group individual queries 502$a$-$i$ into a new cluster, if the individual query 502$a$-$i$ is not similar to the subject matter of the existing clusters 504, 506, 508, and 510.

Figure 6:
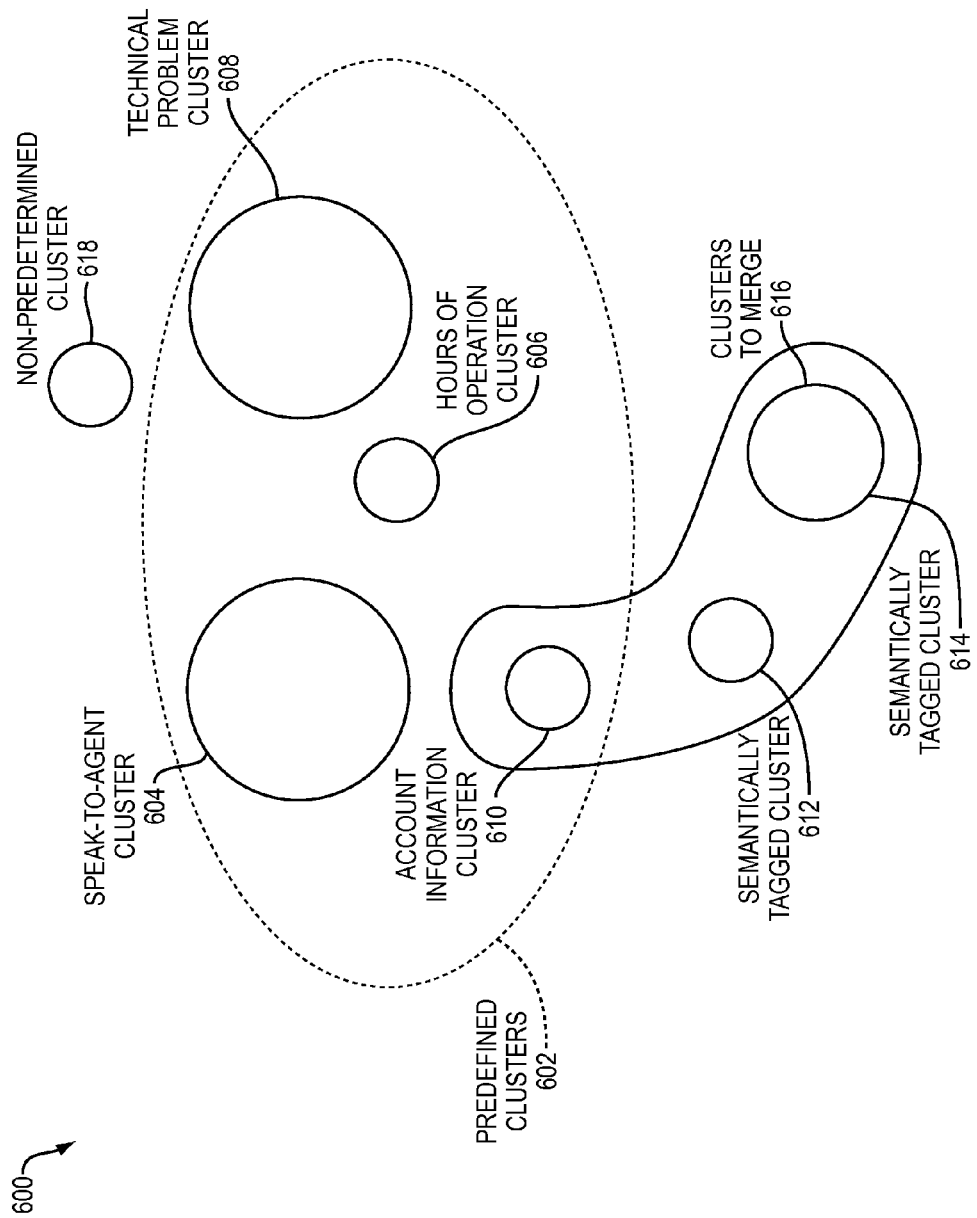
FIG. 6 is a diagram illustrating merging clusters according to an example embodiment of the present invention.

FIG. 6 is a diagram 600 illustrating merging clusters according to an example embodiment of the present invention. The system includes predefined cluster 602, which itself includes a speaker to agent cluster 604, an hours of operation cluster 606, a technical problem cluster 608, and an account information cluster 610. Further, the system also includes a non-predefined cluster 618, and semantically tagged clusters 612 and 614. The system determines that semantically tagged clusters 612 and 614 are similar to the account information cluster 610. The system groups account information cluster 610, semantically tagged cluster 612, and semantically tagged cluster 614 in a clusters merged 616 group.

The tagging process can be performed by at least the following three actions: (1) performing semantic clustering for the input data; (2) assigning a semantic label to each cluster; and (3) mapping the semantic labels to the application tags (the FAQ standard questions).

(1) Performing Semantic Clustering: Semantic clustering verifies predefined clusters. Predefined clusters can be of two types:

(A) Queries associated with questions—one type of predefined cluster includes queries already associated with standard questions. These queries generally come from a previous tagging process. Therefore, these queries automatically generate clusters centered by the standard questions and are not split in the successive tagging process. Untagged raw queries can be added to these clusters.

(B) Queries associated with answers—Another type of pre-defined cluster includes queries corresponding to the same agent response, if available. These queries may or may not belong to the same semantic groups. For example, the following two queries can be treated as predefined clusters given that their agent responses are the same:

(i) "what is the memory requirement for installing DNS 11;" and (ii) "memory requirement for DNS 11 installing."

Such predefined clusters are not split in the subsequent tagging process.

On the other hand, some queries, such as the two queries below, are not treated as predefined clusters, even if they elicit same response.

(i) "can I check my balance;" and (ii) "can I change my password."

The response to both queries is: "sorry, it can only be done at the local branch." Therefore, such an identical agent response to the two different queries does not trigger a pre-defined cluster because the agent responses, while identical, do not indicate that the questions are similar. The predefined clusters generated are undivided and are tagged as a group/whole.

Differentiation between these two types of clusters is performed manually. Therefore, large clusters, as opposed to all clusters, that are grouped according to the human response are verified.

Semantic clustering groups, transcriptions, or sentences can be grouped into clusters based on semantic and orthographic distances. If agent responses are available, the agent responses can also be used as features in computing the orthographic distance.

Semantic clustering is described in Tremblay et al, U.S. application Ser. No. 13/246,801, "Call Steering Data Tagging Interface With Automatic Semantic Clustering," the entirety of which is hereby incorporated by reference. The semantic clustering is performed automatically, under the constraint that the predefined clusters are undivided during the process.

(2) Semantic Labeling and Cluster Cleaning Up: According to the embodiment, the FAQ application employs semantic labels for clusters. There are three types of semantic labels:

(A) FAQ-UTHR label. Semantic tags can be constructed under the FAQ-Universally Tagged High Runner (UTHR) standard (the UTHR tagging methodology is described in Liu, U.S. application Ser. No. 12/422,671, "Knowledge Re-Use For Call Routing," the entire teachings of which are incorporated herein by reference. Such FAQ-UTHR tags can be reused across different applications. For example, "how to restart my laptop", can be tagged as "enquire_how-restart_laptop."

(B) FAQ-UTHR label with application-specific information. Such labels are also constructed under the FAQ-UTHR standard, but with an extra slot to denote app-specific information. Such tags can be partially reused across the applications. For example, "what is the memory installed on my Dell XPS 3100", is tagged as "enquire_laptop-memory; model=xps 3100." Here, the application specific information is "model=xps 3100," but the query retains an application-generic component (i.e., "enquire_laptop-memory").

A label of this type can be assigned in two ways. One approach is to assign the entire label in one pass, while another approach is to assign the complex label incrementally in two passes. In the incremental two-pass tagging approach, the data is first clustered and labeled with generic FAQ-UTHR labels (as described above). In the second pass, the application specific information labels are assigned separately. The application specific labels are assigned either (1) as a sequential second pass or refinement step applied to the results of the first pass (e.g., hierarchical clustering and tagging) or (2) in parallel with the first pass so that the final label is constructed as a merge of the general FAQ-UTHR tags and application specific labels assigned independently.

(C) Representative Question Label. Such labels are used to tag specific problems related to the concerned application and are not reused for other applications. For example, the query, "the green light keeps blinking, and I hear constant beeping from my desktop" is not tagged as FAQ-UTHR style tags because the query itself can be used as the label for this first cluster. If the system finds similar clusters afterwards, such as a second cluster represented by "green light blinking and beeping sound," the first cluster can be then tagged as the selected representative question of the first cluster: "The green light keeps blinking, and I hear constant beeping from my desktop." In such cases, the two clusters are merged together. Therefore, the system can propose semantic labels and clean up clusters simultaneously.

Cleaning up clusters includes merging clusters that share the same semantic tag/label without other distinguishing features. Labels for each semantic cluster can also be added, edited, or verified. Queries can be moved from one cluster to another to purify the clusters. The system can clean up clusters and label the clusters simultaneously.

(3) Mapping Semantic Labels to Application Tags: For clusters containing seeded standard questions, mapping from their semantic labels to the application tags (e.g., the standard question) employs the standard question contained in the cluster. The mapping rules extracted in such cases can also be applied to other clusters of the same semantic label, but not containing an existing standard question.

Clusters without seeded standard questions can be mapped to an existing standard question. For such clusters, the system determines the correct standard question to map to by employing an FAQ system trained with the tagged data. The mapping rules learned here can then be applied to other clusters of the same semantic labels. However, many clusters do not contain a standard question and do not share a semantic label with other clusters. The association from a semantic cluster to an application cluster can be entered manually.

Clusters that do not contain seeded standard questions are not mapped to an existing standard question. For such clusters, new standard questions associated with corresponding answers are manually created. Again the mapping from the semantic labels to the newly created standard questions can then be applied to other clusters of the same semantic labels.

One-to-many mappings from semantic labels to application-specific tags can be created in a case of a query that contains some ambiguity. Several application IDs may be associated with a semantic label. For example, for a user query asking for "installing a network card driver," several application answers can be available depending of the operating system type (e.g., Windows® 8, Windows® 7, Windows® XP, etc.). Therefore, several application IDs are associated with the semantic label of such a cluster.

Semantic labels can be probabilistically mapped to application tags. An application may have statistics from user clicks or other data sources that define a probabilistic mapping for ambiguous queries. Such a probabilistic mapping can be optionally loaded in the FAQ portal to create the tagged data file.

Figure 7:
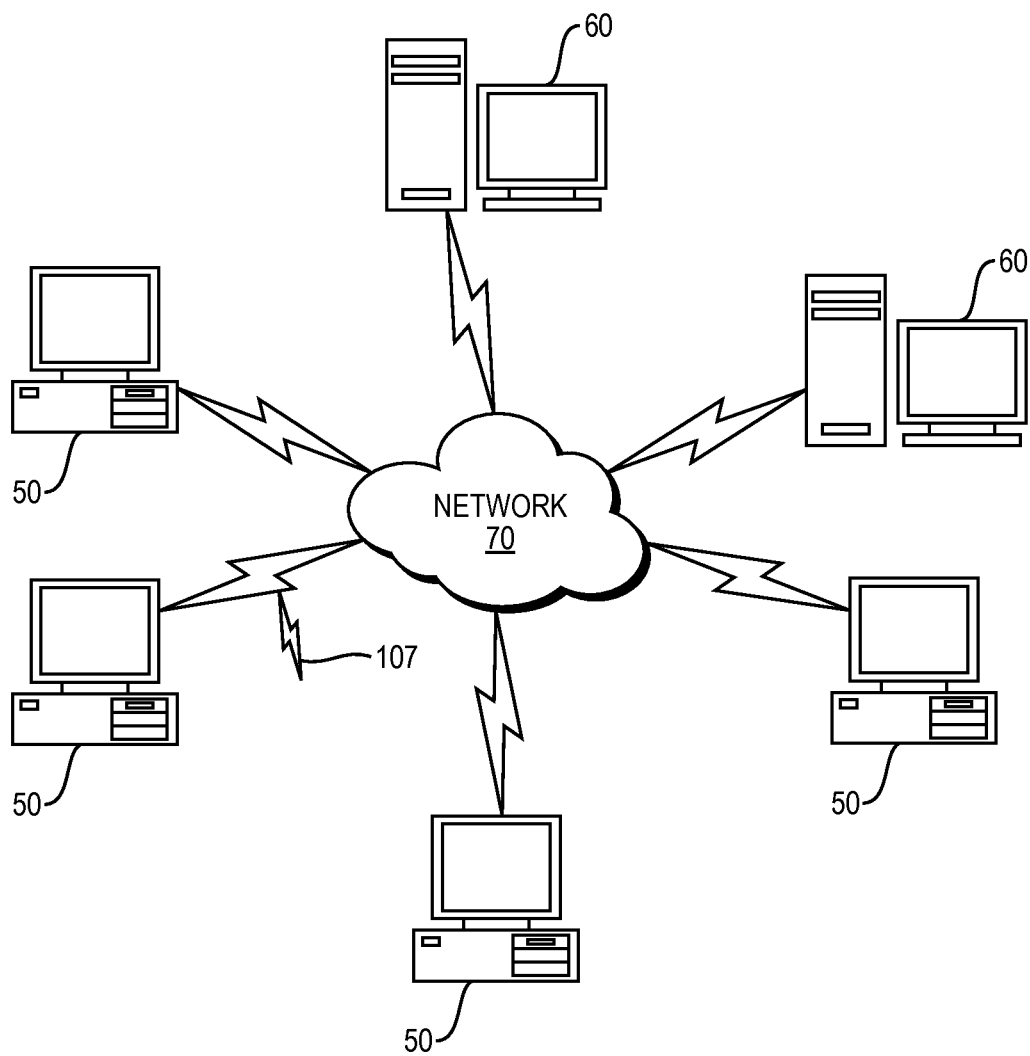
FIG. 7 illustrates a computer network or similar digital processing environment in which embodiments of the present invention may be implemented.

FIG. 7 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 8:
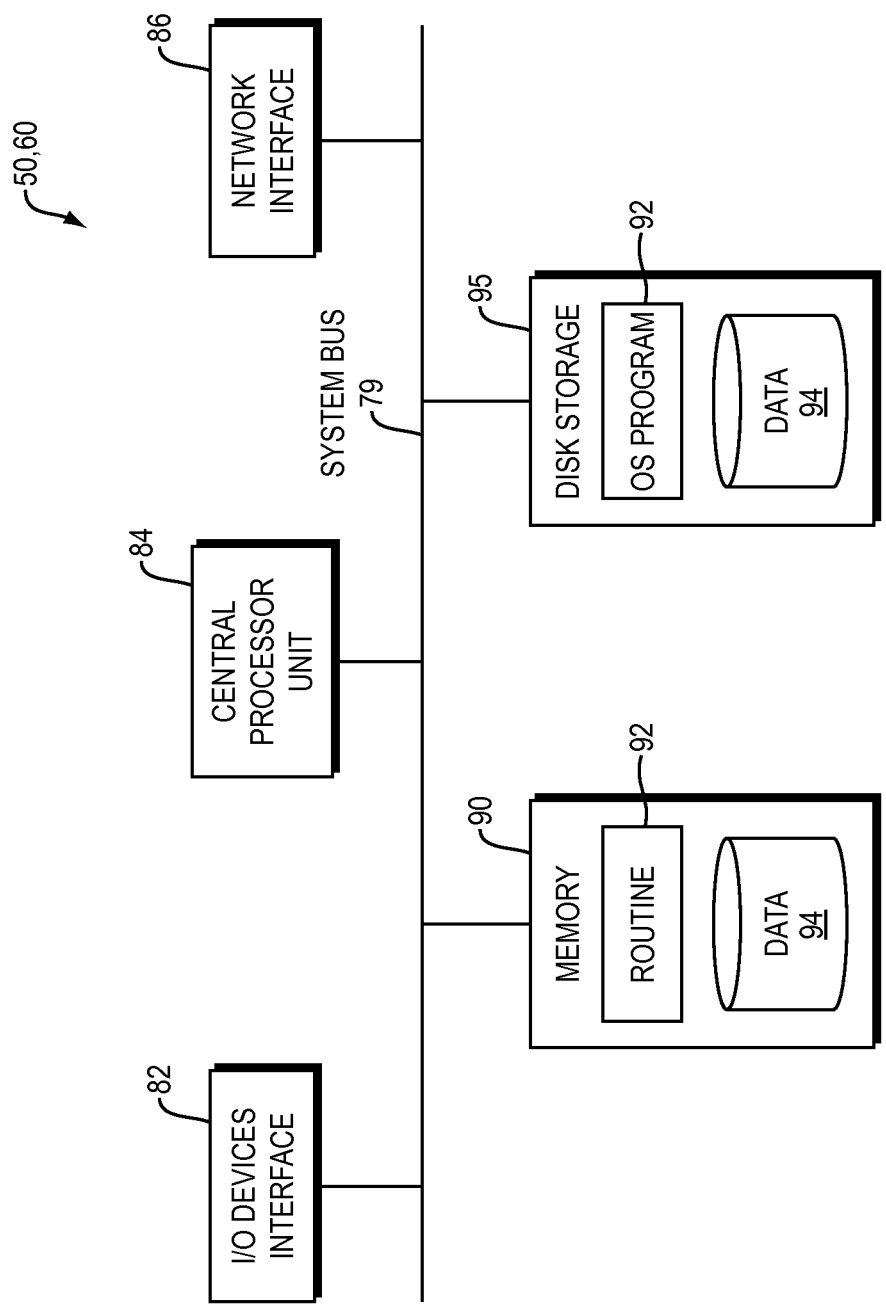
FIG. 8 is a diagram of an example internal structure of a computer (e.g., client processor/device or server computers) in the computer system of FIG. 7.

FIG. 8 is a diagram of an example internal structure of a computer (e.g., client processor/device 50 or server computers 60) in the computer system of FIG. 7. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 7). Memory 90 provides volatile storage for computer software instructions 92 and data 94 used to implement an embodiment of the present invention (e.g., structure generation module, computation module, and combination module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of building a frequently-asked questions (FAQ) portal, the method comprising:
   in a processor of an electronic device:
   creating cluster labels, the cluster labels including predefined universal semantic labels and application-specific labels;
   applying the cluster labels to clusters of queries within an FAQ application; and
   adjusting the application-specific labels to support combined and newly created clusters of queries based on application-specific queries within the FAQ application on an ongoing basis and reapplying the universal semantic labels and the adjusted application-specific labels to the combined and newly created clusters of queries to enable automated clustering of queries and association with applicable answers to improve response time by the electronic device for providing a user with an answer to a query.

2. The method of claim 1 further comprising creating seed clusters based on answers to the queries of the clusters.

3. The method of claim 1, further comprising creating clusters by extracting features of answers independent of the queries.

4. The method of claim 1, further comprising creating one-to-many mappings from the universal semantic labels to the application-specific labels, the one-to-many mappings applying to clusters of queries for which the FAQ application is configured to issue at least one of multiple answers.

5. The method of claim 4, further comprising applying a user-history of the FAQ application to define a one-to-many mapping from the universal semantic label to a most-likely application-specific label.

6. The method of claim 1, wherein creating the cluster labels further includes using content of the query itself as the application-specific label.

7. The method of claim 1, further comprising creating clusters by extracting features of answers dependent on the queries.

8. A system for building a frequently-asked questions (FAQ) portal, the system comprising:
   an electronic device including at least one processor, the at least one processor configured to implement:
   a labeling module configured to create cluster labels, the cluster labels including predefined universal semantic labels and application-specific labels;
   a label application module configured to apply the cluster labels to clusters of queries within an FAQ application; and
   an adjustment module configured to adjust the application-specific labels to support combined and newly created clusters of queries based on application-specific queries within the FAQ application on an ongoing basis and reapplying the universal semantic labels and the adjusted application-specific labels to the combined and newly created clusters of queries to enable automated clustering of queries and association with applicable answers to improve response time by the electronic device for providing a user with an answer to a query.

9. The system of claim 8, further comprising a cluster creation module configured to create seed clusters based on answers to the queries of the clusters.

10. The system of claim 8, further comprising a cluster creation module configured to create clusters by extracting features of answers independent of the queries.

11. The system of claim 8, further comprising a mapping module configured to create one-to-many mappings from the universal semantic labels to the application-specific labels, the one-to-many mappings applying to clusters of queries for which the FAQ application is configured to issue at least one of multiple answers.

12. The system of claim 11, further comprising applying a user-history of the FAQ application to define a one-to-many mapping from the universal semantic label to a most-likely application-specific label.

13. The system of claim 8, wherein the labeling module is further configured to use content of the query itself as the application-specific label.

14. The system of claim 8, further comprising creating clusters by extracting features of answers dependent on the queries.

15. A non-transitory computer-readable medium configured to store instructions for building a frequently-asked questions (FAQ)-portal, the instructions, when loaded and executed by a processor, causes the processor to:
create cluster labels, the cluster labels including predefined universal semantic labels and application-specific labels;
apply the cluster labels to clusters of queries within an FAQ application; and
adjust the application-specific labels to support combined and newly created clusters of queries based on application-specific queries within the FAQ application on an ongoing basis and reapplying the universal semantic labels and the adjusted application-specific labels to the combined and newly created clusters of queries.

16. The non-transitory computer readable medium of claim 15, wherein the instructions further cause the processor to create seed clusters based on answers to the queries of the clusters.

17. The non-transitory computer readable medium of claim 15, wherein the instructions further cause the processor to create clusters by extracting features of answers independent of the queries.

18. The non-transitory computer readable medium of claim 15, wherein the instructions further cause the processor to create one-to-many mappings from the universal semantic labels to the application-specific labels, the one-to-many mappings applying to clusters of queries for which the FAQ application is configured to issue at least one of multiple answers.

19. The non-transitory computer readable medium of claim 18, wherein the instructions further cause the processor to apply a user-history of the FAQ application to define a one-to-many mapping from the universal semantic label to a most-likely application-specific label.

20. The non-transitory computer readable medium of claim 15, wherein creating the cluster labels further includes using content of the query itself as the application-specific label.

* * * * *